J. G. NEGRETE.
SPUR.
APPLICATION FILED JULY 5, 1916.
1,225,350.
Patented May 8, 1917.
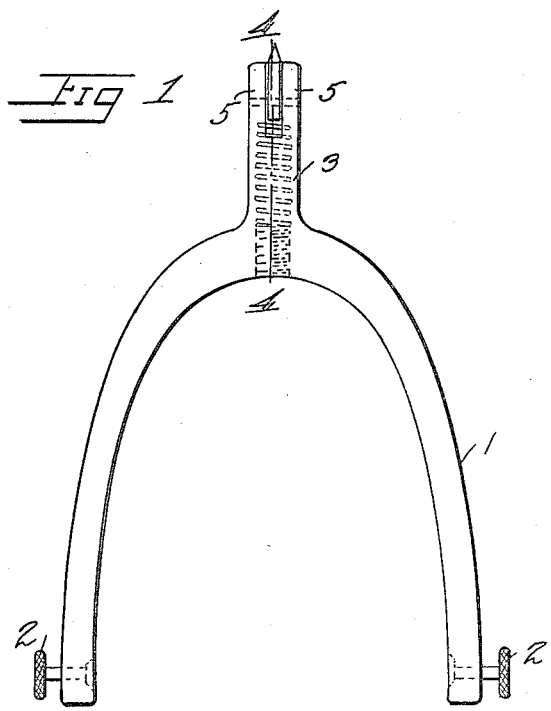
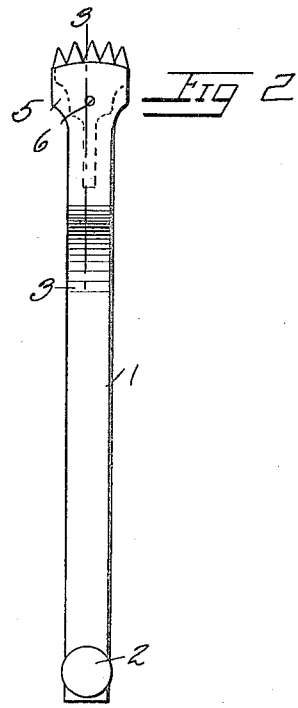
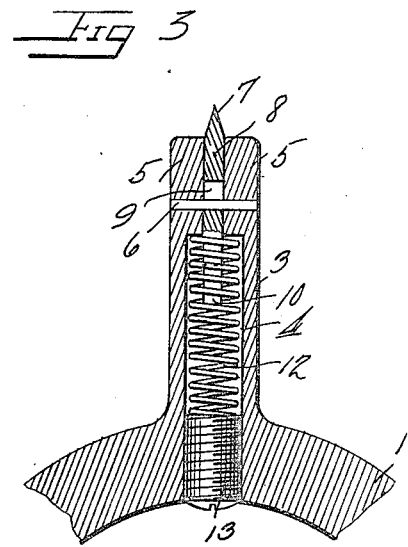
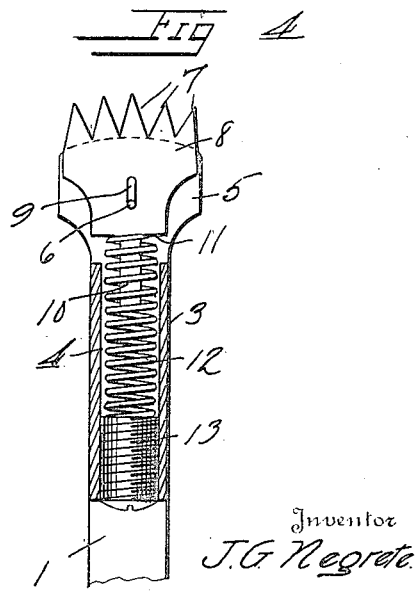

UNITED STATES PATENT OFFICE.

JULIUS G. NEGRETE, OF CERRO, CUBA.

SPUR.

1,225,350.   Specification of Letters Patent.   Patented May 8, 1917.

Application filed July 5, 1916. Serial No. 107,629.

*To all whom it may concern:*

Be it known that I, JULIUS G. NEGRETE, a citizen of the United States, residing at Cerro, in the Province of Habana, Island of Cuba, have invented certain new and useful Improvements in Spurs; and I do hereby declare the following to be a full, clear, and exact description of the invention, such as will enable others skilled in the art to which it appertains to make and use the same.

The present invention is directed to improvements in spurs used by horsemen, and has for its object to provide a device of this character so constructed that the spur teeth cannot inflict unnecessary pain to the animal when operated.

A further object of the invention is to provide a device of this character constructed in such a manner that the spur teeth will be permitted to prick the animal slightly and afterward move to a position so as to prevent further pricking of the animal should the rider exert further pressure with the heel.

A still further object of the invention is to provide a device of this character so constructed that the tension of the spring which controls the action of the spur can be regulated.

With these and other objects in view, this invention resides in the novel features of construction, formation, combination and arrangement of parts to be hereinafter more fully described, claimed and illustrated in the accompanying drawing, in which:

Figure 1 is a plan view of the device.

Fig. 2 is a side elevation.

Fig. 3 is a sectional view on line 3—3 of Fig. 2.

Fig. 4 is a similar view on line 4—4 of Fig. 1.

Referring to the drawing 1 indicates the usual U-shaped frame the ends of which being provided with clamping screws 2, whereby the frame can be conveniently fixed to the heel of the rider.

Carried by the bight of the frame 1 is a shank 3, said shank having formed therein a longitudinal socket 4, the purpose of which will appear later. The outer end of the shank 3 terminates in spaced plates 5, said plates serving to support the pin 6.

The spurs 7 are carried by the head 8, which is provided with a slot 9, said slot being engaged by the pin 6 so as to limit the outward sliding movement of said head. The head 8 is provided with a stem 10 which operates in the socket 4. Shoulders 11 are provided on each side of the stem which shoulders are engaged by one end of the coil spring 12, the other end of said spring being engaged with a threaded plug 13 which is engaged in the forward end of the socket 4, and since the plug 13 is provided with threads it is obvious that the same can be adjusted to regulate the tension of the spring 12.

From the foregoing description it will be seen that when the spurs 7 are engaged with the animal that pressure on the frame 1 will cause the head 8 to move forwardly until the spurs are prevented from further pricking the animal by the adjacent edges of the plates 5. As soon as pressure is relieved upon the frame 1 the spring 12 will cause the head 8 to move outwardly, the outward movement thereof being limited by the pin 6.

What is claimed is:—

In a spur, the combination with a heel engaging frame, of a shank carried by the frame and having a socket formed therein, said shank having spaced plates at its free end, a pin supported by the plates, a head having spurs which are normally extended beyond the adjacent edges of the plates, said spurs being movable to a position between the plates when pressure is exerted thereon, said head having a slot formed therein for slidably engaging the pin, shoulders carried by the head, a coil spring engaged at one end with the shoulders, and a plug engaged in one end of the socket, said plug being engaged by the other end of the spring, and being adjustable to regulate the tension of the spring.

In testimony whereof, I affix my signature, in the presence of two witnesses.

JULIUS G. NEGRETE.

Witnesses:
RAOUL F. WASHINGTON,
L. M. CANTRELL.

Copies of this patent may be obtained for five cents each, by addressing the "Commissioner of Patents, Washington, D. C."